E. FISHER.
VALVE.
APPLICATION FILED JUNE 29, 1915.

1,216,974.

Patented Feb. 20, 1917.

Inventor
Emanuel Fisher
By Horatio E. Bellows
Attorney

UNITED STATES PATENT OFFICE.

EMANUEL FISHER, OF PROVIDENCE, RHODE ISLAND.

VALVE.

1,216,974.　　　　Specification of Letters Patent.　　Patented Feb. 20, 1917.

Original application filed August 28, 1912, Serial No. 717,455. Divided and this application filed June 29, 1915. Serial No. 36,932.

*To all whom it may concern:*

Be it known that I, EMANUEL FISHER, a citizen of the United States, residing at Providence, in the county of Providence and State of Rhode Island, have invented certain new and useful Improvements in Valves, of which the following is a specification.

My invention is a division of my application for valves, filed August 28, 1912, Ser. No. 717,455, which has matured into Patent No. 1,157,641. It has for its primary objects compensation for wear upon the valve and its seat; the prevention of leakage; facility for the successive presentation of valve faces to its seat; to automatically fit the valve and seat; and to attain these ends in a simple and inexpensive structure.

To the recited ends essentially my invention consists in the construction and combination of parts which fall within the scope of the appended claims.

Figure 2:
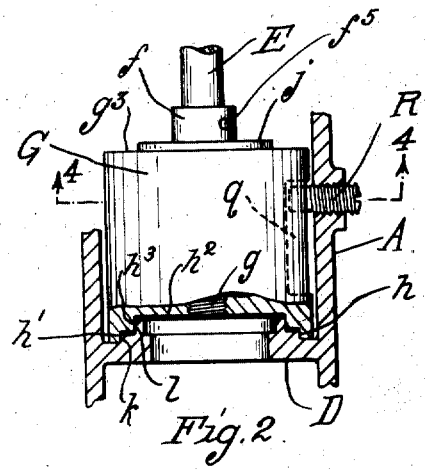
Figure 1:
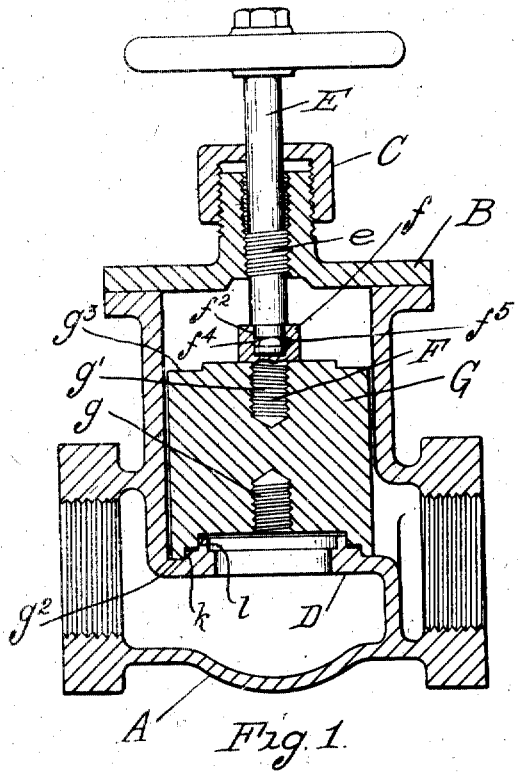
Figure 3:
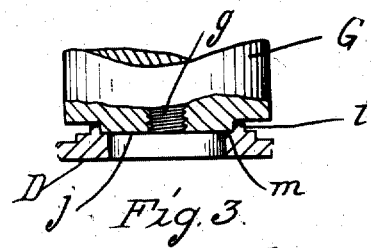
Figure 5:
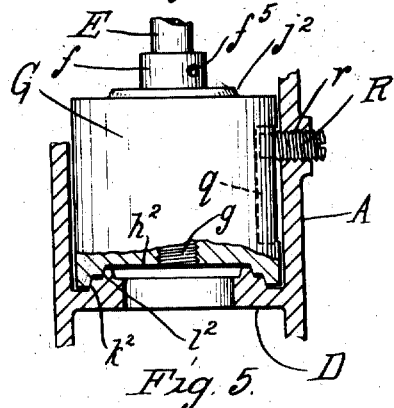
Figure 4:
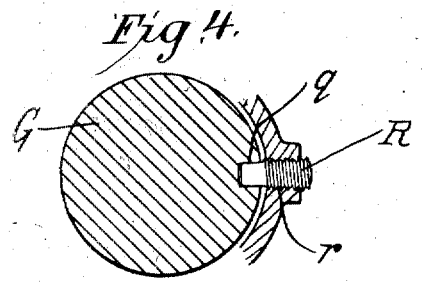
Figure 6:
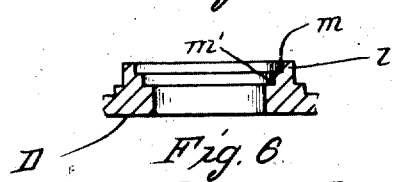

In the accompanying drawings which form a part of this specification,

Figure 1 is a vertical central section of my valve casing and valve,

Fig. 2, a side elevation partially in diametrical section of the valve member, and a similar section of a portion of the adjacent casing, Fig. 3, a similar partial elevation and section of the same showing a second valve face in engagement with the valve seat, Fig. 4, a section on line 4—4 of Fig. 2, Fig. 5, a partial elevation and section similar to Fig. 2 of a modified form, and Fig. 6, a transverse central section of another modified form of my valve seat.

Figure 7:
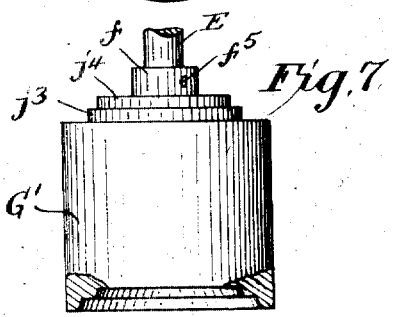

Fig. 7 is an elevation of a modified form of valve.

Like reference characters indicate like parts throughout the views.

In the present instance my invention is shown in conjunction with a valve casing comprising a cylindrical shell A, head B, cap nut C, and partition D. The valve stem is indicated by the reference letter E, and has the usual threads $e$ to engage the head of the valve.

To this stem is swiveled the valve in any convenient manner. In the present instance the connection consists of a screw F provided with a squared head $f$ having an opening $f^2$ adapted to loosely receive the reduced end of the valve stem, the latter being provided with an annular groove $f^4$ to allow passage of a pin $f^5$ which is fixed in the head $f$. Thus the valve stem is rotatable relatively to the screw F.

A cylindrical valve G has axially disposed threaded holes $g$ and $g'$ in its ends to accommodate the screw F.

The valve is provided with two acting faces, $g^2$ and $g^3$, one on each end of the valve. The face $g^2$ has a circular recess $h$ forming an annular inclosing wall $h'$. Concentric with the recess $h$, but of less diameter, and opening out of said recess is a second recess $h^2$ forming an annular inclosing wall $h^3$. Thus are found a plurality of internal steps of successively less diameter.

The face $g^3$ may be provided with a series of circular steps, one step $j$ only being shown in the present instance, but this, with the face $g^3$, constitutes two acting faces.

In Fig. 7 I have shown a valve with a plurality of concentric steps $j^3$, $j^4$ for coöperation with a plurality of concentric internal steps such as $m$, $m'$ seen in Fig. 6.

The partition D is provided with a valve seat comprising external and internal stepped faces adapted to coöperate with the faces of the valve G. In the present instance the seat comprises an external annular elevated shoulder or step $k$ and a second annular external shoulder $l$ thereon, of less diameter than the shoulder $k$. Upon the interior of the seat is an annular shoulder or step $m$. The diameters of the cavity $h$ and the shoulder $k$ are substantially equal, and the diameters of the cavity $h^2$ and the shoulder $l$ are also substantially equal. The depth of the cavities $h$ and $h^2$ are equal to or more than the heights of the shoulders $k$ and $l$ respectively.

The diameter of the elevation $j$ is substantially the same as that of the inner face of the step $l$ and is of the same depth or slightly greater.

The valve G is preferably initially mounted with the parts disposed as shown in Figs. 1 and 2, namely, the face $g^2$ being in coöperation with the seat.

After wear of the coöperating faces in this position, the valve G may be reversed, and the screw F be inserted in the hole $g'$. When so reversed the elevation $j$ rests upon the upper face of the step $m$, and the side face of said elevation is adjacent the inner face of the step $l$, all as shown in Fig. 3.

If desired the side faces of the steps of the seat may be beveled as at $k^2$ and $l^2$, and the side of the elevation $j$ may be beveled as at $j^2$. The walls of the cavities $h'$ and $h^3$ may then be beveled as at $h^4$ and $h^5$, all as shown in Fig. 5.

The number of outside and inside steps constituting the valve seat may be increased to any desired number. In Fig. 6 is shown at $m'$ one additional inside seat to accommodate one additional step $j^4$.

As the valve G slides vertically in the valve casing a guiding means is provided. In the present instance it consists of a screw R threaded in an opening $r$ in the casing and projecting loosely into a vertical slot $q$ in the side of the valve G.

The series of steps on the valve and valve seat afford compensation means, as the faces successively wear, to maintain a permanently effective closure of the valve. The valve series also serve to automatically square the valve in its seat.

I claim:—

1. In a device of the type set forth, the combination of a valve seat comprising a series of concentric external steps, and a cylindrical valve comprising a flat operating end face provided integrally with a series of concentric cavities adapted to severally embrace the steps with the concentric faces of said steps and cavities in engagement with each other.

2. In a device of the type set forth, the combination of a valve seat comprising a plurality of concentric internal steps, a cylindrical valve provided with an operating end face, and integral concentric steps upon said face adapted to register with the first mentioned steps with the concentric faces of the steps of said valve and seat in contact with each other.

3. In a device of the type set forth, the combination of a valve seat comprising concentric external and internal steps, a reversible cylindrical valve comprising integral flat operating end faces, one of said faces being provided with cavities adapted to embrace the external steps, and a step on the other face adapted to register with one of the internal steps.

4. As a new article of manufacture, a cylindrical valve provided with integral end operating faces, one of said faces being provided integrally with concentric cavities of different diameters, and a step upon the other face, said faces being also provided with threaded recesses, said valve being reversible whereby either end may be used with a stepped valve seat.

5. In a device of the type set forth, the combination of a valve casing, a valve seat in the casing comprising concentric steps, a reversibly mounted cylindrical valve slidably mounted in the casing, one end of said valve being provided with a cavity adapted to coöperate with one step, and a step upon the other end of the valve adapted to engage another step, the opposite faces of said valve being provided with threaded apertures and a valve stem removably engageable with either of said apertures.

6. In a device of the type set forth, the combination of a valve casing, a valve seat in the casing comprising concentric steps, a cylindrical valve slidably mounted in the casing, means in the casing for longitudinally guiding the valve, steps upon one end of the valve integral therewith adapted to register with a portion of the first-mentioned steps, an integral step on the other end of said valve adapted to engage another of the first mentioned steps whereby said valve may be used in reverse position, and a valve stem in the casing attached to one end of the valve.

7. In a device of the type set forth, the combination of a valve casing, a valve seat in the casing comprising concentric steps, a cylindrical valve slidably mounted in the casing provided with a longitudinal slot in its side, one of the ends of the valve being provided with a cavity comprising a plurality of steps integral with said valve and adapted to coöperate with a portion of the steps upon the seat, a valve stem in the casing attached to the other end of the valve, said other end of the valve having an integral concentric step adapted to engage another of the steps upon the seat whereby it may be reversibly used, and a member in the casing extending into the slot.

8. In a device of the type set forth, the combination of a valve seat comprising concentric steps provided with beveled side faces and flat end faces, and a valve provided integrally with concentric steps provided with inclined side faces and flat end faces, the side faces of the valve seat being arranged to coöperate with the side faces of the valve steps, and the flat faces of the valve seat being arranged to coöperate with the flat faces of the valve.

9. In a device of the type set forth, the combination of a valve casing having a valve seat comprising an external annular elevated shoulder and a second annular external shoulder of less depth, and a valve having two acting faces one on each end thereof, one face having a recess forming an annular inclosing wall for one of said shoulders and an annular wall of less diameter for inclosing the other shoulder, said inclosing walls being at least equal to the heights of said shoulders, said valve being reversible and the valve seat having an interior annular shoulder adapted to coöperate with the other acting face of the valve.

In testimony whereof I have affixed my signature.

EMANUEL FISHER.